United States Patent [19]

Formia

[11] 4,046,128

[45] Sept. 6, 1977

[54] CYLINDER HEADS FOR INTERNAL COMBUSTION COMPRESSION-IGNITION ENGINES

[75] Inventor: Antonio Formia, Turin, Italy

[73] Assignee: FIAT Societa per Azioni, Turin, Italy

[21] Appl. No.: 623,161

[22] Filed: Oct. 16, 1975

[30] Foreign Application Priority Data

Oct. 28, 1974 Italy .................................. 70187/74

[51] Int. Cl.² ........................... F02F 7/00; F02B 77/00
[52] U.S. Cl. ............................ 123/195 C; 123/195 A; 123/198 E
[58] Field of Search ............. 123/198 E, 90.37, 90.38, 123/195 C, 198 R, 195 R, 195 A

[56] References Cited

U.S. PATENT DOCUMENTS

| 3,063,439 | 11/1962 | Kessel | 123/90.38 |
| 3,396,712 | 8/1968 | Sakraida | 123/198 E |
| 3,684,053 | 8/1972 | Fachbach | 123/198 E |
| 3,724,599 | 4/1973 | Heidacker | 123/198 E |
| 3,773,142 | 11/1973 | Bragg | 123/198 E |
| 3,822,763 | 7/1974 | Adams | 123/198 E |
| 3,869,859 | 3/1975 | Thornburgh | 123/198 E |

Primary Examiner—Carroll B. Dority, Jr.
Assistant Examiner—Daniel J. O'Connor
Attorney, Agent, or Firm—Sughrue, Rothwell, Mion, Zinn and Macpeak

[57] ABSTRACT

A cylinder head for a compression-ignition (diesel) engine has a sector accommodating the upper part of a fuel injector between four valves, the sector being isolated from the tappet lubricating oil by a protecting casing on the upper part of the cylinder head. The casing may itself be sealed by a protective and soundproofing cover.

2 Claims, 6 Drawing Figures

CYLINDER HEADS FOR INTERNAL COMBUSTION COMPRESSION-IGNITION ENGINES

BACKGROUND OF THE INVENTION

The present invention relates to cylinder heads for compression-ignition internal combustion engines, in particular Diesel engines of the four valve type with a fuel injector located in a central vertical plane between the valves.

The central positioning of the fuel injector is already known, as are the advantages which this entails, particularly as regards improved combustion, due to the geometry of the fuel injection nozzles forming between them a smaller angle, with a consequent reduction of its sump or their casing, resulting in a uniform distribution of the fuel and therefore a reduced emission of hydrocarbons, which is wholly advantageous and ecologically desirable.

Apart from the aforesaid well known advantages, however, serious irregularities were encountered in the installation of the fuel injector which, although mounted inside the cylinder head, was nevertheless for the purpose of saving space located in the lower part of the cylinder head.

As a result, difficulties were encountered in sealing, the injector-housing sector being immersed in the lubricating oil through the tappet.

Moreover, the accessibility of the fuel injector was awkward, involving, for the purpose of injector replacement or inspection, laborious operations of dismantling, reassembling, and inspection, control and balancing of the parts of the tappet surrounding the fuel injector.

A further difficulty encountered in such earlier known fuel injector installations was that the efficiency of the injector was somewhat compromised due to contamination by leakages of oil which, mixed with fuel leakages, dust and other foreign bodies, gave rise to sludge or like contaminating deposits.

Furthermore, the previously known central positioning of the fuel injector was somewhat complex, since the injector had to be fitted in two pieces, one of which, called the bar, was installed horizontally in relation to the other, for connection to an external fuel supply conduit.

The object of the present invention is to eliminate the above-mentioned disadvantages by providing a fuel injector which can be assembled straightforwardly and quickly, and which affords efficient combustion and is economical in use.

SUMMARY OF THE INVENTION

According to the present invention there is provided a cylinder head for compression-ignition internal combustion engines with four valves and a fuel injector located between the valves, the head being fitted with a protective casing enclosing tappet assemblies, wherein the casing includes internal structure adapted to define a sector-shaped space within the casing isolated from tappet assemblies and sealed from lubricating oil supplied to the head, said space housing an upper part of the injector and associated fuel piping in use of the head.

In accordance with a preferred feature of the invention a cover is fixed to the top of the casing and covers the upper part of the injector, the said cover housing in its interior sound insulating and protective inserts, the said cover being made either in a single body or in two parts.

BRIEF DESCRIPTION OF THE DRAWINGS

The invention will now be described, by way of non-limiting example, with reference to the attached drawings, in which.

DETAILED DESCRIPTION OF THE ILLUSTRATED EMBODIMENTS

Figure 1:
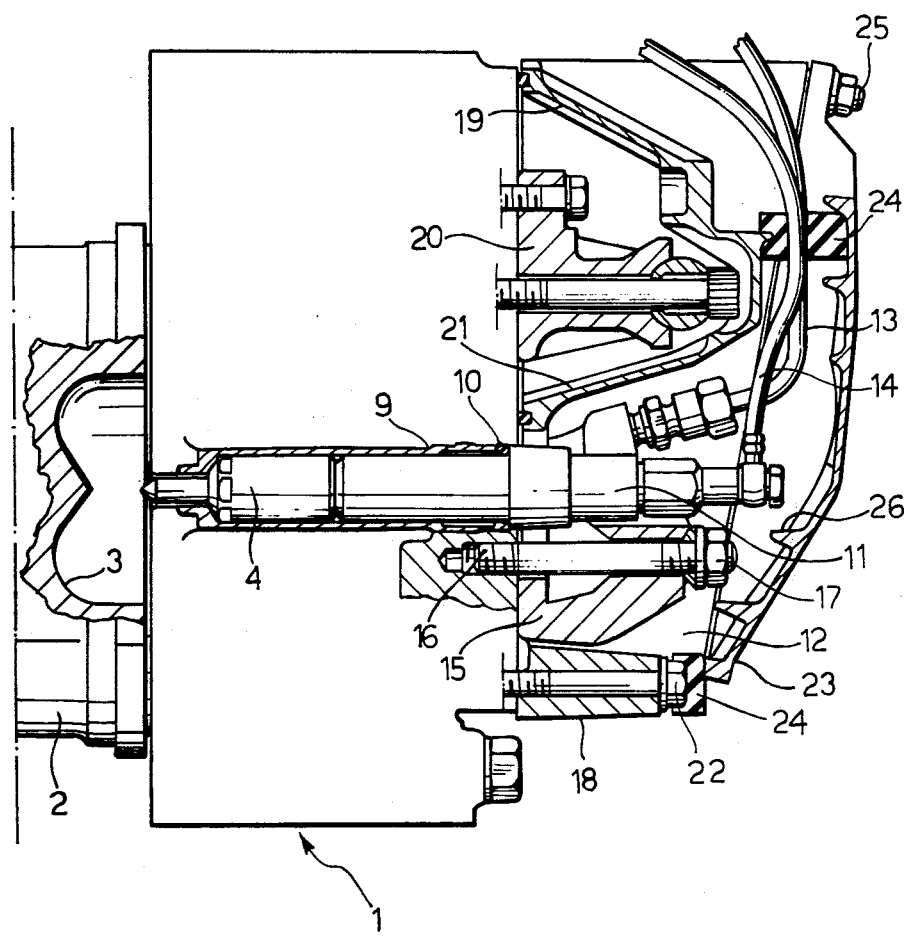
FIG. 1 is a partial cross-sectional view of the upper part of the cylinder head of an engine according to one embodiment of the invention.
Figure 2:
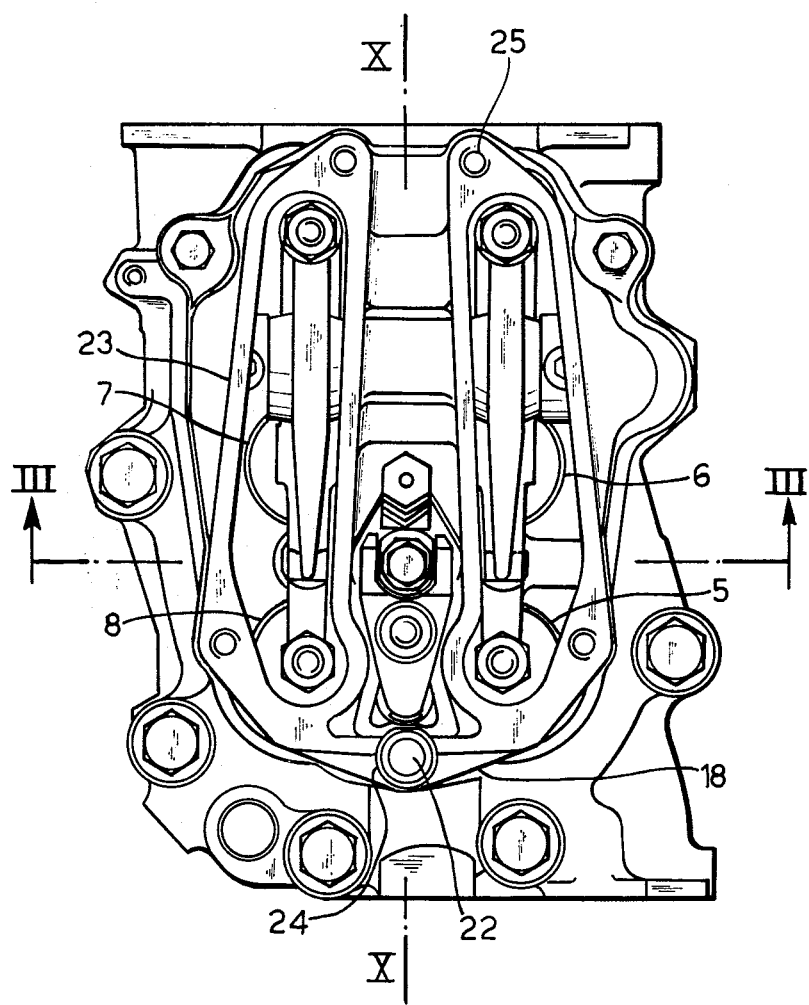
FIG. 2 is a plan view of the cylinder head shown in FIG. 1.

In the drawings the same reference numerals are used throughout to indicate the same or corresponding component parts.

Reference numeral 1 indicates part of a cylinder head of a "Diesel" compression-ignition internal combustion engine. In the lower part of the cylinder head 1, directly above one of the pistons 2 with its associated combustion chamber 3, there is fitted a vertical fuel injector 4, located through the interposition of a guide bush 9 and a compression ring 10. The fuel injector 4 is positioned in the vertical plane X—X containing the axes of four valves associated with the respective cylinder, namely exhaust valves 5, 6 and inlet valves 7, 8.

In accordance with the invention, the fuel injector 4 is mounted with an uncovered part 11 projecting into the upper part 12 of the head 1. The upper part 12 of the head 1 incorporates fuel supply piping 13 and appropriate fuel supply connections and return piping 14 for conducting away any excess fuel from the injector, the upper part 12 being held by a clamping bracket 15 which is in turn secured to the cylinder head 1 by a stud bolt 16 and a clamping nut 17.

All these parts are enclosed by a casing 18 having an internal recess 19 surrounding and protecting a rocker-arm support 20 while at the same time isolating the fuel injector 4 from the lubricating oil by means of a wall 21 of the casing 18 which separates the projecting part 11 of the injector from the rocker arm support 20.

The casing 18 is attached to the head 1 by means of screw bolts 22.

Above the casing 18 there is positioned a cover 23 enclosing the entire structure and incorporating inserts or blocks 24 of vibration-damping and protective rubber material. The cover 23 is secured to the casing 18 by stud bolts fitted with nuts 25.

The cover 23 is provided with a series of internal reinforcing ribs 26 which resist flexing of the cover due to vibrations, which are particularly severe in these kinds of high compression engines, in which combustion is effected by comression.

Figure 3:
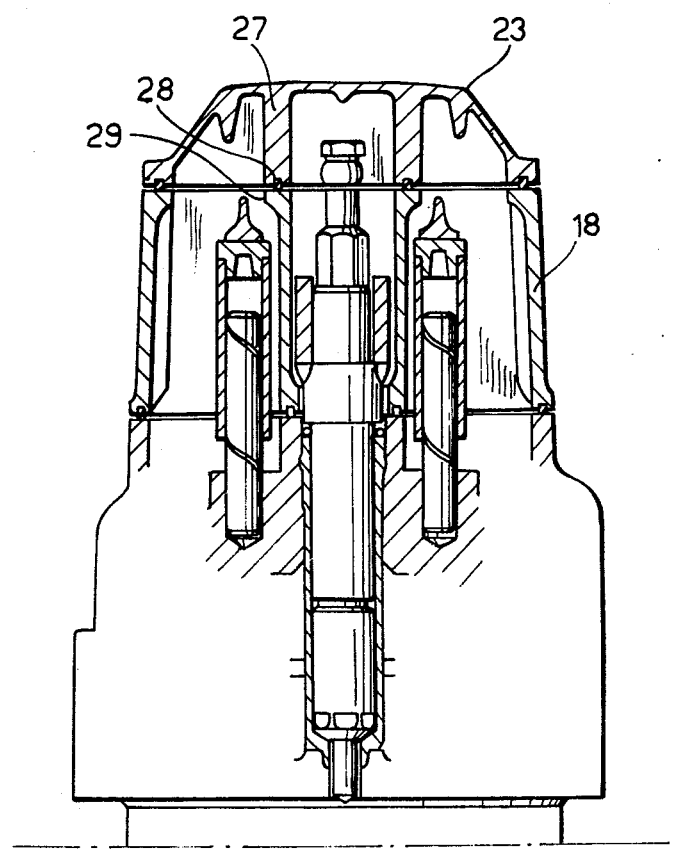
FIG. 3 is a cross-section taken on line III—III of FIG. 2.

As shown in FIG. 3, the ribs on the inside of the cover 23 include a pair of ribs 27 which are deeper than the others, so that they engage, through interposed sealing rings 28, with a corresponding pair of vertical walls 29 of the casing 18. The wall 21 completes a sector shaped space for housing the upper part 11 of the fuel injector 4.

Figure 4:
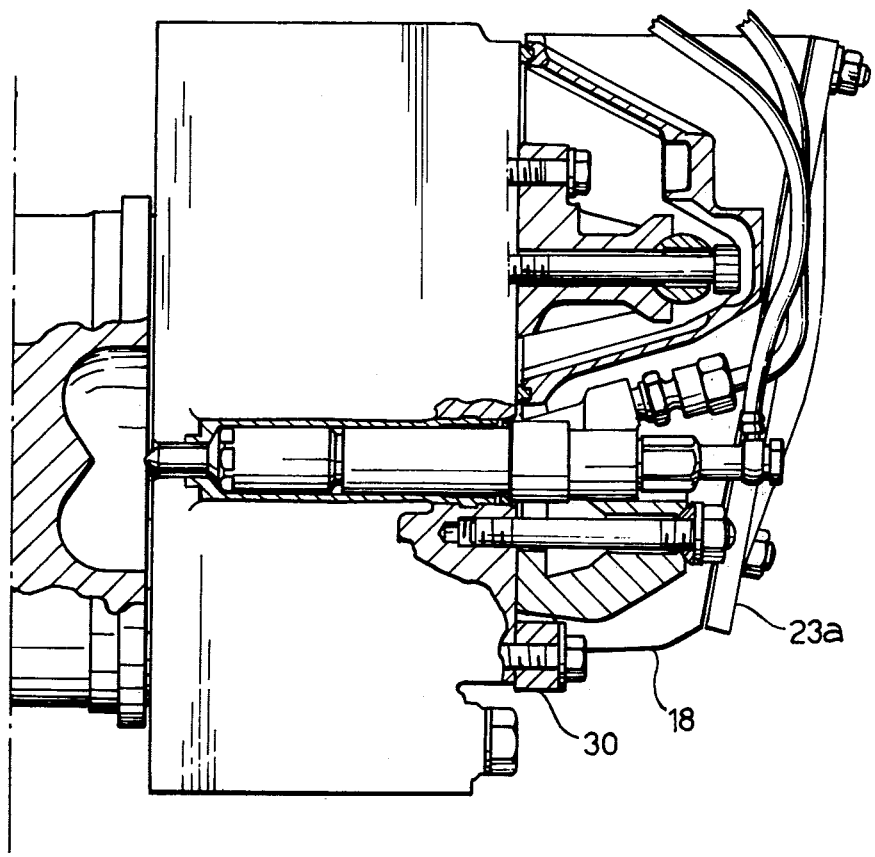
FIGS. 4, 5 and 6 are views similar to FIGS. 1, 2 and 3 respectively illustrating an alternative embodiment of the invention.
Figure 5:
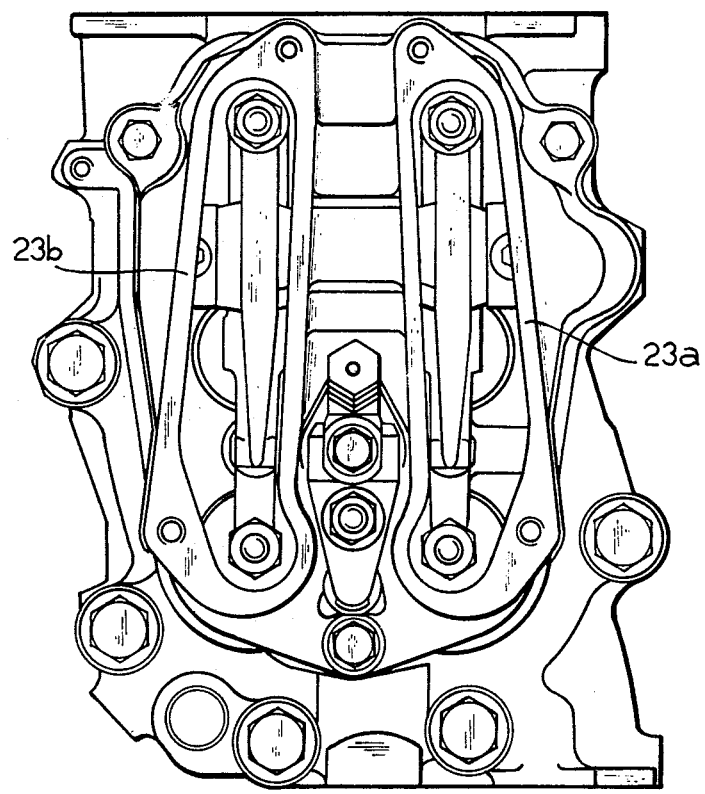
Figure 6:
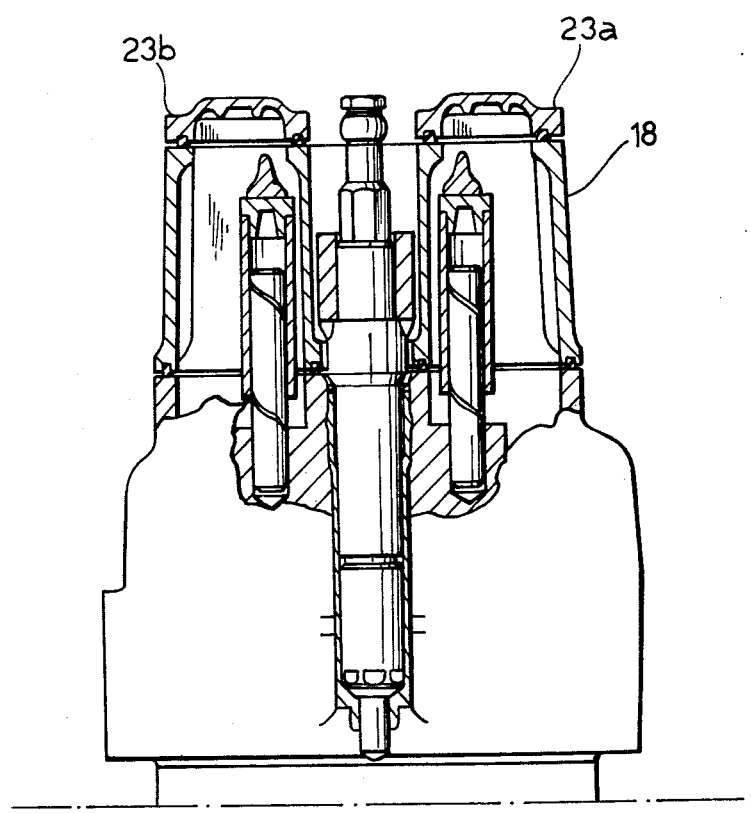

In accordance with the variant illustrated in FIGS. 4-5-6 an outer peripheral flange 30 of the casing 18 is reduced in order to improve access to the component parts and receives a cover 23 which is divided into two parts, 23a, 23b to improve accessibility to the injector.

It will be apparent that the mounting of the injector vertically and with an upper part protruding into a sector isolated from the cylinder head has practical advantages as regards accessibility and sealing.

In particular, when it is necessary to replace or clean the fuel injector it will be possible to proceed swiftly even with the vehicle in operation.

Indeed, even with a brief stop on the road and without using special equipment, access can easily be gained to the injector by simply removing the outer cover 23.

As far as the cover 23 is concerned, its special structure, incorporating vibration-damping inserts, serves an important and two-fold function, of sound insulation and protection of the fuel injector from the ingress of foreign bodies.

Such protection of the fuel injector is contributed to by the casing which, with its internal walls, defines a mounting position for the injector which is completely impervious to the foreign bodies deriving from it. Consequently inspections for cleaning operations or maintenance checks will be less frequent, the injector maintaining full efficiency for a longer time than earlier known cylinder heads.

I claim:

1. In a diesel internal combustion engine of the type having a cylinder head having four valves and a fuel injector located between the four valves the improvement comprising a casing mounted on said cylinder head and surrounding said valves and injector, said casing having a pair of spaced apart vertical walls extending across said casing to divide the interior of said casing into three compartments with said injector located in a separate one of said compartments, a cover secured to said casing having a pair of spaced apart depending ribs disposed in engagement with said vertical walls and sealing means between said walls and said ribs so that said injector is disposed in a sealed compartment.

2. In a diesel internal combustion engine as set forth in claim 1 wherein said cover is provided with additional internal reinforcing ribs.

* * * * *